(12) United States Patent
Crane et al.

(10) Patent No.: US 7,544,055 B2
(45) Date of Patent: Jun. 9, 2009

(54) METHOD OF RESIN TRANSFER MOLDING AND COMPONENTS FOR USE THEREWITH

(75) Inventors: Steve Crane, Stanwood, WA (US); Johannes Krogman, Arlington, WA (US); Matthew Boyd, Stanwood, WA (US); Rob Hill, Camano Island, WA (US); David Miller, Marysville, WA (US); Corey Nianekeo, Marysville, WA (US); Mark Paulhus, Marysville, WA (US); Brett Schnelder, Sumner, WA (US); Joe Blodgett, Kill Devil Hills, NC (US)

(73) Assignee: Brunswick Corporation, Lake Forest, IL (US)

( * ) Notice: Subject to any disclaimer, the term of this patent is extended or adjusted under 35 U.S.C. 154(b) by 645 days.

(21) Appl. No.: 10/695,949

(22) Filed: Oct. 30, 2003

(65) Prior Publication Data

US 2004/0089984 A1 May 13, 2004

Related U.S. Application Data

(62) Division of application No. 09/886,107, filed on Jun. 22, 2001, now abandoned.

(60) Provisional application No. 60/213,476, filed on Jun. 23, 2000.

(51) Int. Cl.
*G16K 21/00* (2006.01)
*B29C 37/00* (2006.01)
*B29C 70/40* (2006.01)

(52) U.S. Cl. ............... 425/564; 425/543; 425/DIG. 224

(58) Field of Classification Search ................ 425/564, 425/543, 544, 549, DIG. 224, DIG. 228, 425/511; 137/625.11, 625
See application file for complete search history.

(56) References Cited

U.S. PATENT DOCUMENTS

| | | | | | |
|---|---|---|---|---|---|
| 1,245,233 | A | * | 11/1917 | Hynes | .................. 236/37 |
| 2,140,735 | A | * | 12/1938 | Clarke et al. | ............. 184/104.1 |
| 2,806,075 | A | * | 9/1957 | Gaubatz | .................... 136/231 |
| 3,015,227 | A | * | 1/1962 | Barber, Jr. | ................. 73/23.42 |
| 3,695,149 | A | * | 10/1972 | Eberhart | ..................... 92/168 |
| 3,985,300 | A | * | 10/1976 | Pinney | ....................... 239/119 |
| 4,741,364 | A | * | 5/1988 | Stoss et al. | ............. 137/625.64 |
| 4,902,215 | A | | 2/1990 | Seemann, III | |
| 4,942,013 | A | | 7/1990 | Palmer et al. | |
| 5,152,949 | A | | 10/1992 | Leoni et al. | |

(Continued)

*Primary Examiner*—Matthew J. Daniels
(74) *Attorney, Agent, or Firm*—Fitch, Even, Tabin & Flannery (57) ABSTRACT

A method of resin transfer molding uses an open base mold filled with fiberglass material and a soft tool sealed over the base mold. A vacuum is applied to a vacuum chamber that surrounds the mold and communicates with the fiberglass material through vacuum conduits. Resin is injected into the closed mold and is drawn through the fiberglass material to the edge of the mold with the assistance of the vacuum. The soft tool is preferably a flexible sheet having an edge seal to connect to the base mold and a vacuum channel with a vacuum port that surrounds the mold. The injection head releasably connects to the soft tool and preferably uses a solenoid actuated injector to supply resin to the mold. The injection head can include a self sealing device to seal the injection port and a self cleaning mechanism for flushing resin from the interior chamber of the head.

18 Claims, 7 Drawing Sheets

U.S. PATENT DOCUMENTS

| | | | |
|---|---|---|---|
| 5,187,001 A * | 2/1993 | Brew | 425/145 |
| 5,665,301 A | 9/1997 | Alanko | |
| 5,770,243 A | 6/1998 | Butterworth | |
| 5,939,013 A | 8/1999 | Han et al. | |
| 6,090,335 A | 7/2000 | McClure et al. | |

* cited by examiner

FIG. 21

METHOD OF RESIN TRANSFER MOLDING AND COMPONENTS FOR USE THEREWITH

CROSS-REFERENCED APPLICATIONS

This application is a divisional of U.S. application Ser. No. 09/886,107, filed Jun. 22, 2001, which claims the benefit of U.S. Provisional Application No. 60/213,476, filed Jun. 23, 2000, the complete disclosure of which is incorporated herein by reference

BACKGROUND OF THE INVENTION

1. Field of Invention

This invention relates to a method of molding parts, particularly molding resin infused fiberglass parts. This invention also relates to the components used for such molding, including the injector head and mold device.

2. Description of Related Art

Fiberglass parts infused with resin are commonly used as building components that require strength and durability at a low weight and cost. Such components are used in many vehicles, especially in the marine industry where such parts are valued for their superior waterproof and weather resistant properties.

Typically, fiberglass parts are made in open molds by laying down fiberglass sheet material, spraying resin onto the mold to saturate the fiberglass material and allowing the part to cure. During the molding process, if all of the fiberglass chopped strand is not coated with the resin or if it is applied in uneven thickness, the part may have uneven strength characteristics. Also, peeling, flaking and deterioration can result from incomplete or inconsistent lay-up. Thus, the even and consistent application of resin to the part is very important during the molding process.

Due to the current trend toward stricter environmental regulations, open molding is becoming disfavored. When using an open mold, the resin emits restricted compounds and noxious fumes, including styrene and curatives therefor, while curing. Presently, U.S. government regulations restrict the emission of styrene and its curatives, and overseas such emissions are often prohibited. To limit the environmental exposure and conform to regulations, methods of closed molding have been developed.

In one known method of forming a part in a closed mold, resin is infused into fiberglass by (1) covering the mold, (2) applying a vacuum at the center of the mold, and (3) applying resin near the edges of the mold and drawing the resin through the fiberglass toward the vacuum application point, using various films and flow enhancing techniques. Such vacuum assisted processes are generally known as VARTM (vacuum assisted resin transfer molding.) However, it is difficult to ensure complete and even infusion in such a method. Also, resin tends to be left in the supply channels and pulled into the vacuum source, which requires additional cleanup that increases costs and can create additional emission of fumes. The films and flow enhancing media are typically single use, incurring additional cost as well.

Thus, there is a need to provide a reliable method of infusion that results in consistently uniform infused parts while limiting the emission of restricted compounds.

SUMMARY OF THE INVENTION

One aspect of the invention is to provide a method of producing a consistently strong and durable part.

Another aspect of the invention is to provide a method that can comply with current and future environmental regulations and guidelines in the U.S. and abroad.

A further aspect of the invention is to practice a method that is efficient in terms of time and material cost.

According to embodiments of the invention, a method of molding a part comprises preparing a base mold, placing a layer(s) of fiberglass in the base mold, and forming a closed mold by sealing a soft tool to the base mold over the layer of fiberglass, wherein a vacuum channel is defined between the soft tool and the base mold. Then, a vacuum is applied to the vacuum channel at a vacuum port, thus creating a vacuum within the mold. A resin is injected into the mold to infuse the fiberglass layer with resin. The resin infused fiberglass is cured to form a part.

The method can further comprise applying a gel coat to the mold prior to placing the layer of fiberglass in the base mold. Also, the layers of fiberglass can consist of plural layers of fiberglass sheet material, and support members can be placed in the mold with the layers of fiberglass.

The step of injecting the resin can include injecting the resin at a single injection port in the soft tool or at plural ports. The injection port can be spaced from the vacuum port, and more particularly can be spaced inwardly of the vacuum channel.

The vacuum channel can extend around the edge of the base mold. At least one vacuum conduit can be applied to the base mold prior to forming the closed mold, so that the vacuum channel communicates with the fiberglass layer via the vacuum conduit.

Embodiments of the invention also include the soft tool for use in a closed mold. The soft tool according to the invention comprises a sheet having an outer edge, a seal formed at the outer edge configured for sealing engagement with a base mold, a vacuum channel formed at the outer edge and spaced inwardly of the seal, the vacuum channel being defined by at least one wall spaced inwardly of the seal, and at least one injection port disposed in the sheet.

The vacuum channel of the soft tool can have flexible side walls. The vacuum channel can be defined by the seal and the inwardly spaced wall, two spaced walls, or a plurality of walls forming multiple channels. The walls can have a V-shaped cross-section. A vacuum port can be formed in the vacuum channel for attachment to a vacuum source.

The sheet can be formed of flexible, resilient material with a flange seal that protrudes outwardly from the sheet. The injection port formed in the sheet can have a fastening formation and can be formed as a hollow collar secured to the sheet.

Embodiments of the invention also include an injection head for ejecting a flowable substance that comprises a housing including a chamber defined within at least a portion of the housing. The chamber has a supply port, a purge port, and an outlet. An actuator is supported by the housing, and an injection spindle is connected to the actuator and slidably retained within the chamber between an ejection position and a deployed position.

The injection head can also include a fastener disposed at the outlet of the chamber in order to achieve a sealed union with the injection port on the soft tool. The fastener can be a threaded collar, a locking groove and flange, or other known fastening device. The actuator can be a solenoid disposed at one end of the housing opposed to the outlet. The supply port can be disposed adjacent the outlet with the purge port disposed between the supply port and the solenoid.

A tube of low friction material can be retained within the chamber. The tube can have a seal retained at an edge adjacent the outlet. The injection spindle can have a surface of low friction material. The injection spindle can also have a variable cross-section to form passages between the chamber and the spindle.

A removable plug can be releasably retained within the chamber. The removable plug can be disposed at an end of the injection spindle when the injection spindle is in the ejection position. The injection spindle can have an end shaped to complement the removable plug. The plug can be slidably retained within the chamber and positioned at the outlet when the injection spindle is in the deployed position. The plug can be any shape, such as a sphere or a disk.

These and other aspects of the invention will be apparent when taken in conjunction with the drawings and detailed description below.

BRIEF DESCRIPTION OF THE DRAWINGS

Referring to the drawings that form part of this original disclosure.

DETAILED DESCRIPTION OF PREFERRED EMBODIMENTS

Figures 1, 2, 3:
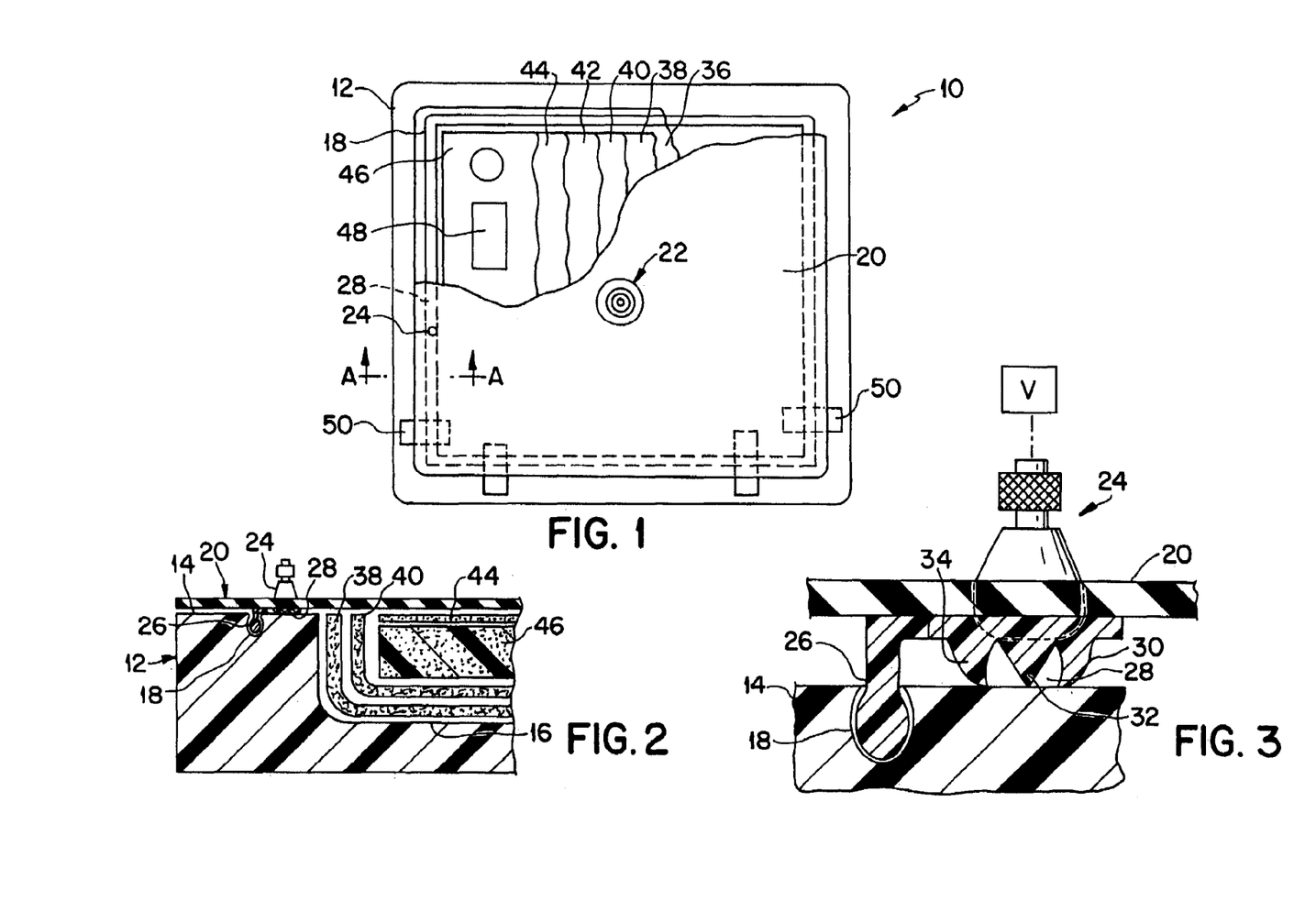
FIG. 1 is a plan view, partially cut-away, of a mold in accordance with the embodiments of this invention.
FIG. 2 is a partial cross section of the mold of FIG. 1 taken along line A-A.
FIG. 3 is an enlarged partial cross section of the soft tool of FIG. 2.

The molding process according to this invention is described herein with use of an exemplary molding device shown in FIG. 1 that produces a generally square molded part, such as a boat hatch. However, the process described herein and the component parts described for use therewith could be used for molding any type of part, including any shape and configuration. For example, the process and equipment, shown used with a conventional open based mold, could be used with a custom base mold. The process could also be used in conjunction with an automated process in which molding is one step in an automated manufacturing system. Further, the process could be used with a fiberglass preform, rather than with mats of fiberglass material as described in detail below.

Mold Device

Referring to FIG. 1, a mold device 10 in accordance with an embodiment of the invention is shown in plan view. Mold device 10 includes a base mold 12 formed of hardened fiberglass composite. In this example as seen in FIG. 2, base mold 12 is a tray shape with a flange edge 14 and a central indented section 16 in which the part will be formed. Circumscribing the edge 14 is a groove 18, shown having a bulbous cross section. Any shape of groove, lip or other interlocking structure that would effect sealing is suitable. Of course, any type of known base mold, including concave or convex molds, could be used and could be shaped to correspond to the desired shape of the part.

A soft tool 20 is attached to base mold 12 to form the top of closed mold device 10. Soft tool 20 is preferably a flexible sheet, sometimes referred to as a bag, that seals to edge 14 of base mold and is made of a material strong enough to withstand vacuum pressure during molding. An example of a suitable material is silicon rubber. Other resilient, durable materials could be used. The sheet in this case is impervious to the solvents in the molding resin and impermeable but could be made of a material permeable to certain compounds to facilitate curing if desired. The sheet can also include adhered forms, made of silicon, Krayton, or rubber for example, to create certain molded features in the part.

At least one injection port 22, described below, is provided in a central region of soft tool 20, and a vacuum port 24 is provided in the edge of soft tool 20. Vacuum port 24 may be of any conventional configuration and is designed to connect to a vacuum source V.

The edge of soft tool 20 has a seal 26 that is designed to mate with groove 18 in edge 14 of base mold 12. Seal 26 is shown as a bulbous tongue that circumscribes the edge of the sheet. Seal 26 is a resilient strip secured to the edge of the sheet. Seal 26 may be a separate piece integrally attached to the sheet or a unitary extension of the sheet. The tongue and groove design in the exemplary embodiment allows a fast and secure connection between soft tool 20 and base mold 12. However, any mating configuration can be used to seal soft tool 20 to base mold 12.

Disposed inwardly of seal 26 with respect to the outer edge of soft tool 20, a vacuum channel 28 is formed having at least one flexible wall 30. Vacuum channel 28 is defined by wall 30 and any number of additional walls 32 and 34 or seal 26. As shown in FIG. 3, wall 34 and wall 30 create a vacuum channel with wall 32 acting as a central support to add stability to the channel. Walls 30 and 34 are generally wedge shaped and can bend inward to effect sealing when the vacuum is applied, as exhibited in FIG. 3. Any shape channel and wall is suitable to form a vacuum channel. Multiple walls can be used to create more than one vacuum channel. The channel can be formed of a separate strip or strips applied to soft tool 20 or can be integrally formed with soft tool 20, tongue 26, or both.

Vacuum port 24 is positioned on the sheet to communicate with vacuum channel 28. At the point of entry into vacuum channel 28, the walls 30, 32, 34 can be cut away.

Injection port 22 is shown centrally located in FIG. 1, but could be located anywhere spaced inwardly of the edge depending on the shape of the base mold and part configuration. Also, plural injection ports 22 could be used, again depending on the shape of the base mold and part configuration and size. Injection port 22 is configured to mate with an injection head described below.

Injection Head

Injection head 100 is shown in FIGS. 4-17 and is preferably configured to connect with an injection port in a mold. However, the features of injection head 100 discussed herein are not limited to injection heads that attach to ports in a mold. This injection head 100 could be used without a mating connector and could be used in applications other than molding.

Figure 4:
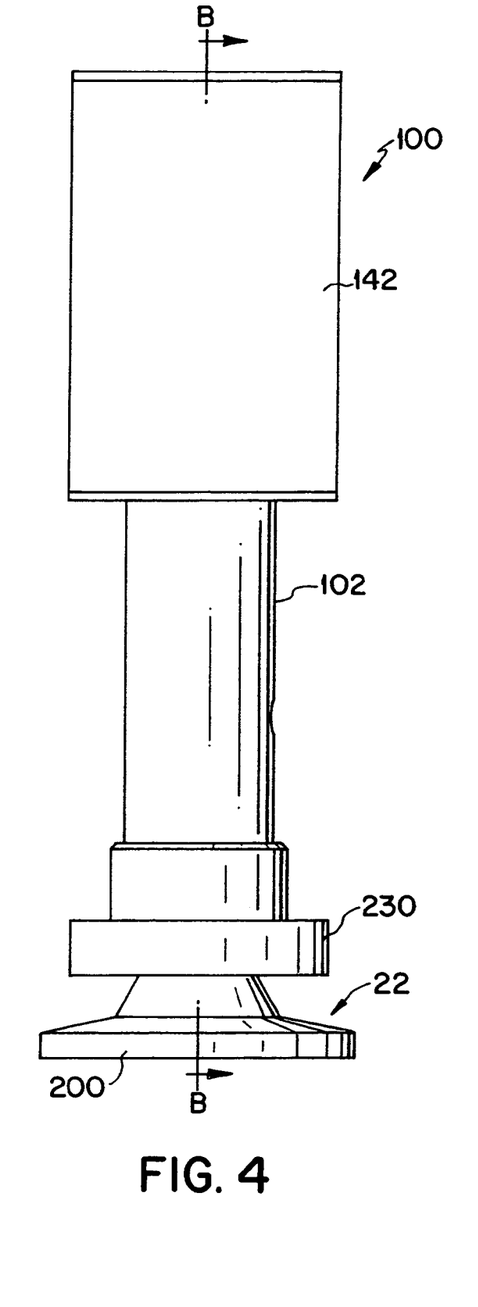
FIG. 4 is a side view of an injection head in accordance with an embodiment of the invention.

FIG. 4 shows one embodiment of injection head 100 attached to injection port 22. Injection port 22 includes a collar 200 that is molded to soft tool 20. Preferably, collar 200 is made of similar material as soft tool 20 to facilitate attachment to soft tool 20. However, collar 200 can be any material or configuration that allows attachment to soft tool 20. Within collar 200 is an upper puck 202 and a lower puck 204, seen in detail in FIGS. 6-8 and 9-11, respectively.

Figure 6:
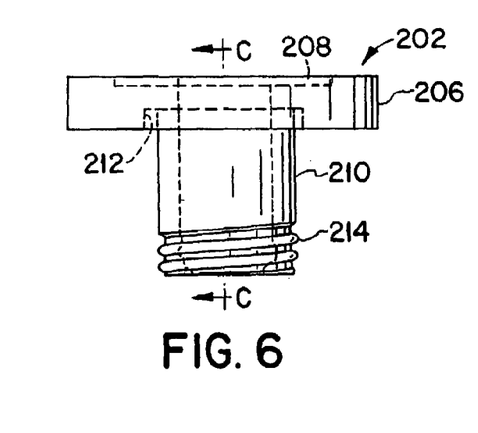
FIG. 6 is a side view of the upper puck of the injection port in the soft tool for use with the injection head of FIG. 4.
Figure 7:
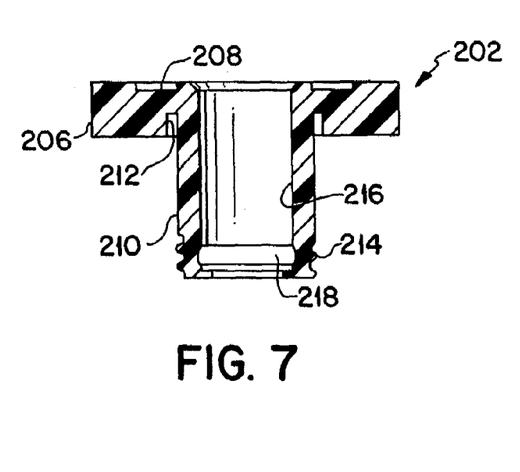
FIG. 7 is a cross section of the upper puck of FIG. 6 taken along line C-C.
Figure 8:
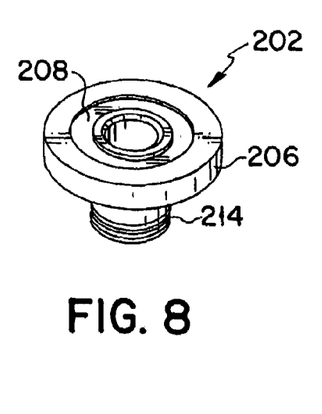
FIG. 8 is a perspective view of the upper puck of FIG. 6.

Upper puck 202 is a hollow sleeve that provides a mating surface to connect to injection head 100. Preferably, upper puck 202 is made of a material that facilitates sliding, such as Teflon. Upper puck 202 includes a ring 206 having an engaging groove 208 that receives a seal from injection head 100. Body 210 is shown recessed within ring 206 by groove 212. However, this configuration is not required with body 210 directly connected to ring 206. The outer surface 214 of the lower edge of body 210 is threaded, as seen in FIGS. 6-8. The inner surface 216 of body 210 is grooved to form a seat 218.

Figure 9:
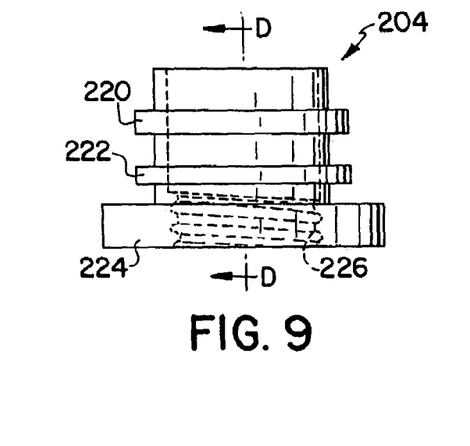
FIG. 9 is a side view of the lower puck of the injection port in the soft tool for use with the injection head of FIG. 4.
Figure 10:
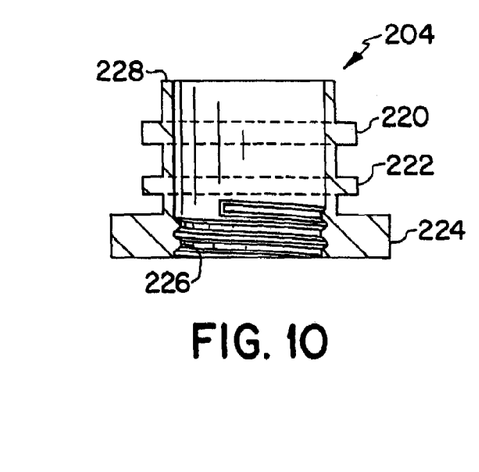
FIG. 10 is a cross section of the lower puck of FIG. 9 taken along line D-D.
Figure 11:
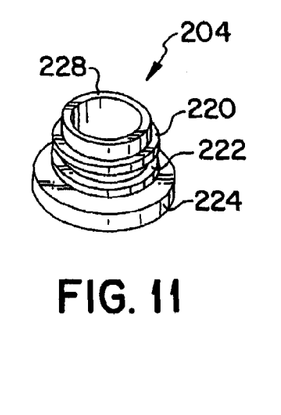
FIG. 11 is a perspective view of the lower puck of FIG. 9.

Lower puck 204 is shaped to be cast in collar 200. Preferably, lower puck 204 is made of a material with high strength, such as metal. Lower puck 204 is a hollow cylinder with exterior flanges 220, 222 and 224 protruding therefrom to enhance attachment to collar 200. Any number or shape of flanges or protrusions could be employed to facilitate attachment. Lowest flange 224, as viewed in FIGS. 9 and 10, is internally threaded 226 and sized to receive threads 214 from upper puck 202. Upper edge 228 is an annular ring is sized to be received in groove 212 to make a secure inlet forming injection port 22.

An injector fastener 230 is releasably retained around collar 200 of injection port 22. Fastener 230 is a collar or ring that is internally threaded. The outer surface of fastener 230 can be textured to afford a secure grip during assembly.

Figure 12:
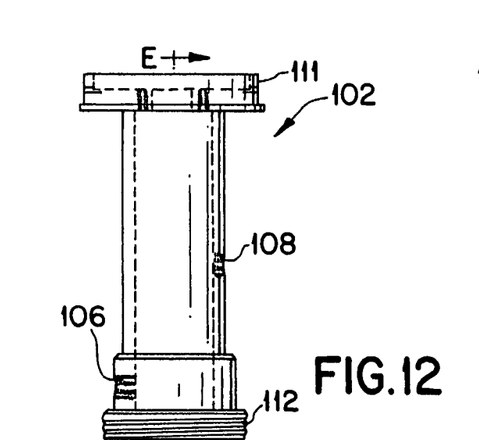
FIG. 12 is a side view of the lower portion of the housing of the injection head of FIG. 4.
Figure 13:
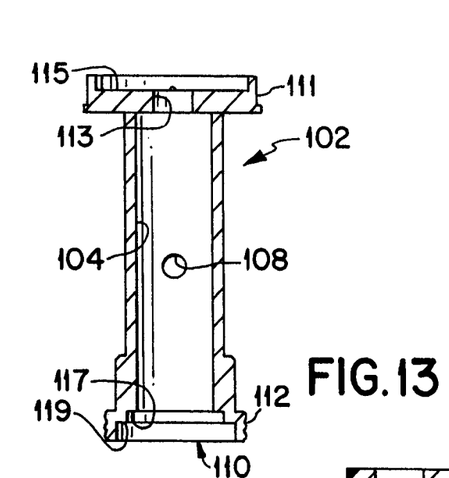
FIG. 13 is a cross section of the lower portion of the housing of FIG. 12 taken along line E-E.
Figure 14:
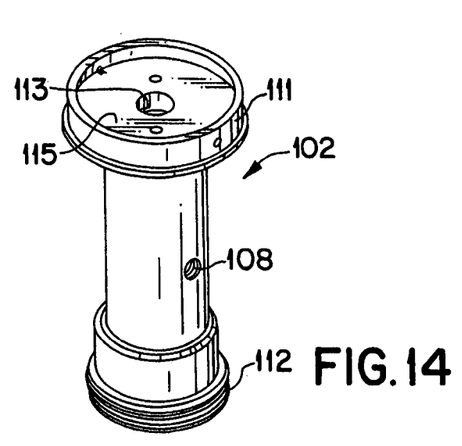
FIG. 14 is a perspective view of the lower portion of the housing of FIG. 12.

Injection head 100 has a housing 102, seen in detail in FIGS. 12-14, with a chamber 104 defined therein. Housing 102 is preferably a tube made of stainless steel or aluminum, for example. Housing 102 has a supply port 106, a purge port 108 and an outlet 110. Supply port 106 and purge port 108 are shown as being internally threaded, but may be configured various known ways to attach to supply lines and sources. Also, the ports are shown as being radial bores but can be angled toward outlet 110 to facilitate flow. The exterior surface of outlet 110 of housing 102 is a threaded flange 112 with a pair of stepped internal shoulders 117 and 119. The end of housing 102 opposed to outlet 110 is a cap 111 with a throughbore 113 and an upper seat 115.

Figure 5:
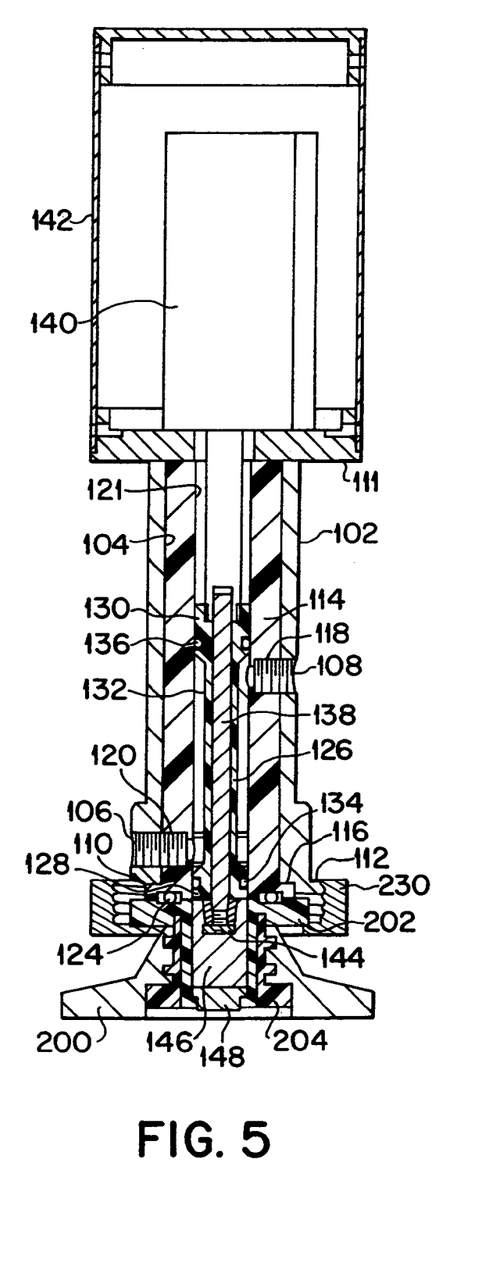
FIG. 5 is a side view in partial cross-section of the injection head of FIG. 4 taken along line B-B.
Figure 15:
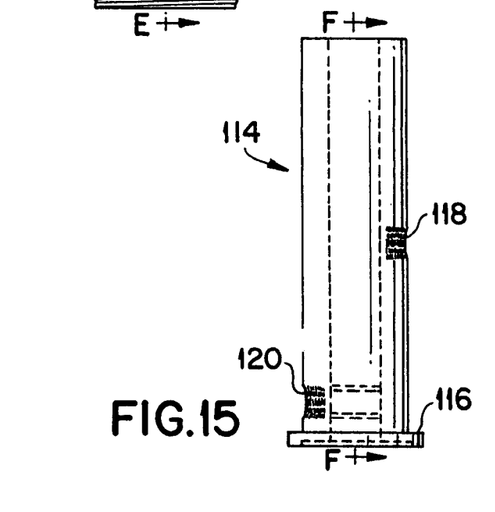
FIG. 15 is a side view of the tube within the housing of the injection head of FIG. 4.
Figure 16:
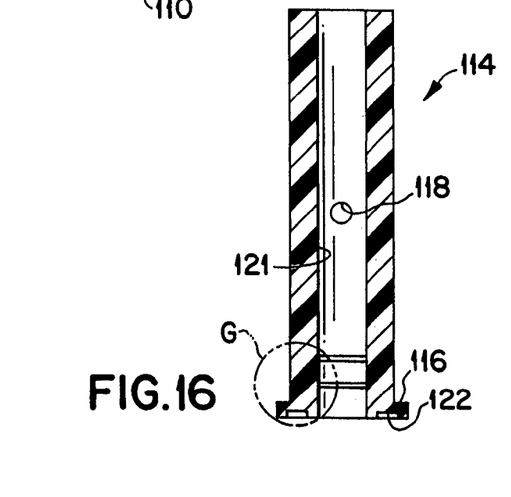
FIG. 16 is a cross section of the tube of FIG. 15 taken along line F-F.
Figure 17:
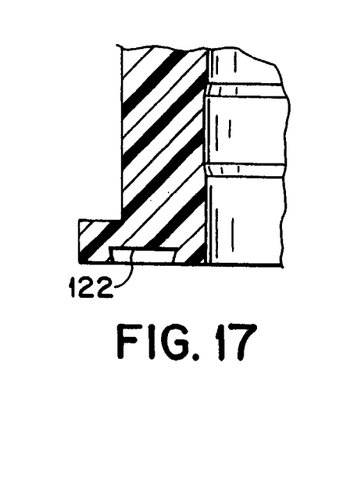
FIG. 17 is an enlarged view of the detail shown in circle G of FIG. 16.

Disposed within housing 102 in chamber 104 is a tube 114, seen in detail in FIGS. 15-17. Tube 114 is preferably made of low friction material such as Teflon. Alternatively, the inner surface of housing 102 could be coated with a low friction material, rather than using tube 114. Tube 114 has a lower flange 116 that mates with internal shoulder 117 of flange 112 at outlet 110. Tube has a supply port 118 and a purge port 120 that are positioned to correspond with supply port 108 and purge port 106 to make a passage to interior chamber 121 of tube 114. Lower flange 116 has a lower surface with an engaging groove 122, shown in detail in FIG. 17. Engaging groove 122 has a tapered mouth for retaining a seal 124, as shown in FIG. 5.

An injection spindle 126 is retained within chamber 121 in tube 114. Injection spindle 126 has enlarged ends 128 and 130 with an indented central section 132 spaced from the interior walls of chamber 121. Each end 128 and 130 is grooved and carries a seal 134 and 136 to seal against chamber 121. Injection spindle 126 is axially slidable within chamber 121 and is preferably formed of a material that facilitates sliding, such as Teflon.

Injection spindle 126 is supported by a rod 138 with threaded ends. Of course, a solid spindle, a fully threaded rod or a rod with other fastening formation could be used. One end of rod 138 is connected to a conventional solenoid 140 that actuates sliding of spindle 126, which acts as a piston. Solenoid 140 is supported in upper seat 115 of housing 102. A cover 142 is secured to cap 111. The other end of rod 138 is connected to a cap screw 144, which holds spindle 126 in place and supports tip 146. A plug 148 is retained against tip 146 within chamber 121 when spindle 126 is in an ejection position raised toward solenoid 140. FIG. 5 shows a deployed position of spindle 126 in which plug 148 is pushed into injection port 22 and retained in seat 218 of upper puck 202, best seen referring to FIG. 7.

Upon assembly of the injection head 100 to injection port 22, housing 102 is aligned with upper puck 202 so that ring 206 of upper puck 202 abuts shoulder 119 in outlet 110 of housing 102. Seal 124 is received in groove 208 of injection port 22. Fastener 230 is threaded onto threads 112 of housing 102 to securely clamp injection head 100 against injection port 22, as seen in FIG. 5.

In operation, resin is supplied through supply port 106 with spindle 126 raised in the ejection position above supply port 106. Due to enlarged end 128, seal 134 and pre-deployed plug 148, resin is prevented from flowing upward into chamber 121 and must flow toward outlet 110. Plug 148 is retained above supply port 106 against tip 146. Then, in the cleaning mode, spindle 126 is moved down chamber 121 past outlet 110 so that end 128 is disposed below supply port 106 and end 130 is disposed above purge port 108. Cleaner is then flushed through purge port 108 between chamber 121 and central section 132 and out through supply port 106. Spindle 126 can then be recovered from its deployed position in chamber 121 via solenoid 140 leaving plug 148 in seat 218.

Figure 18:
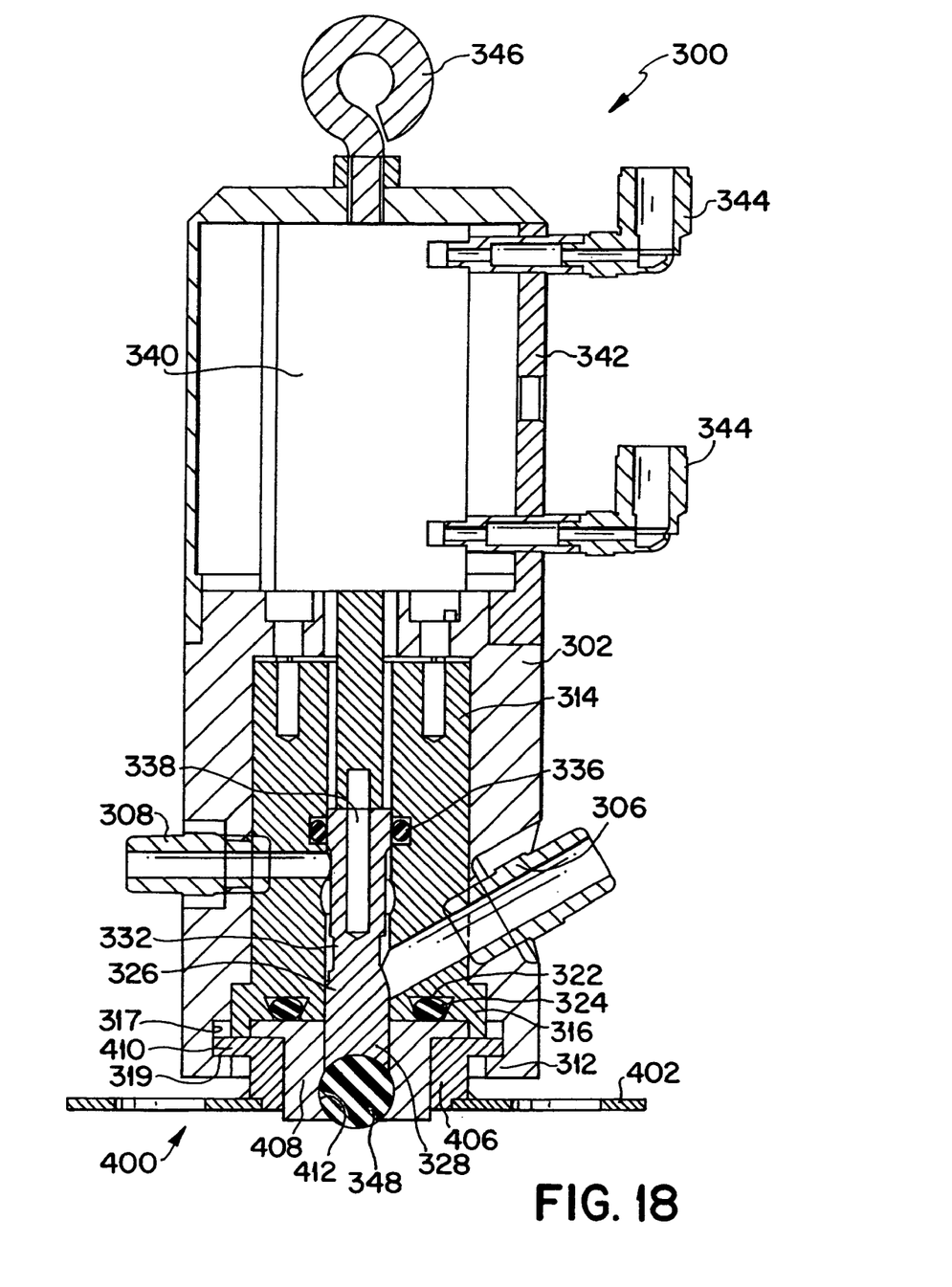
FIG. 18 is a side view in partial cross-section of an injection head according to another embodiment of the invention.
Figure 19:
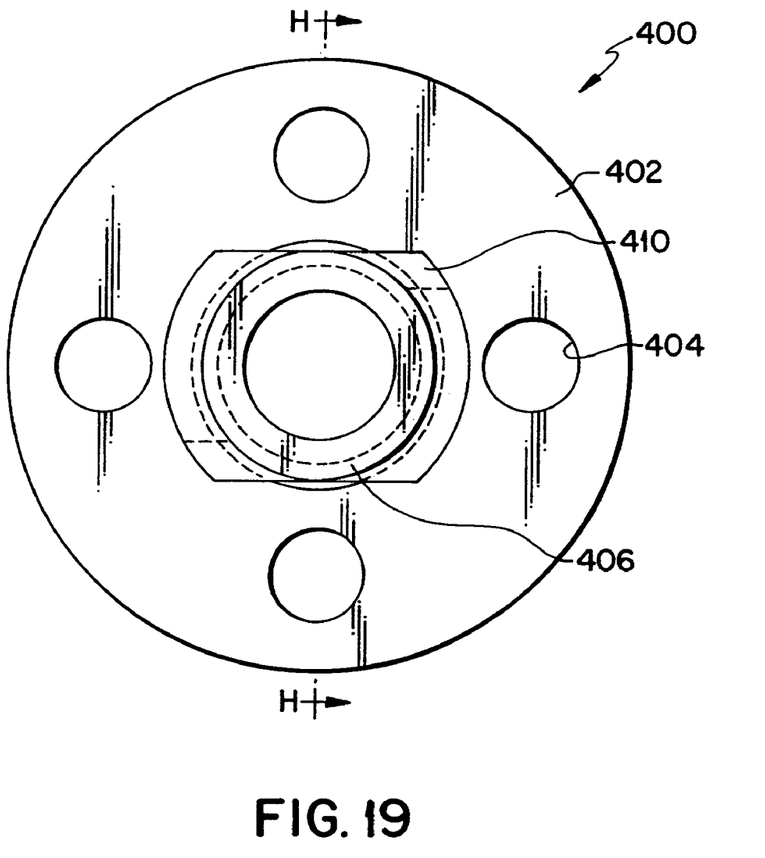
FIG. 19 is a top view of the injection port for use with the injection head of FIG. 18.
Figure 20:
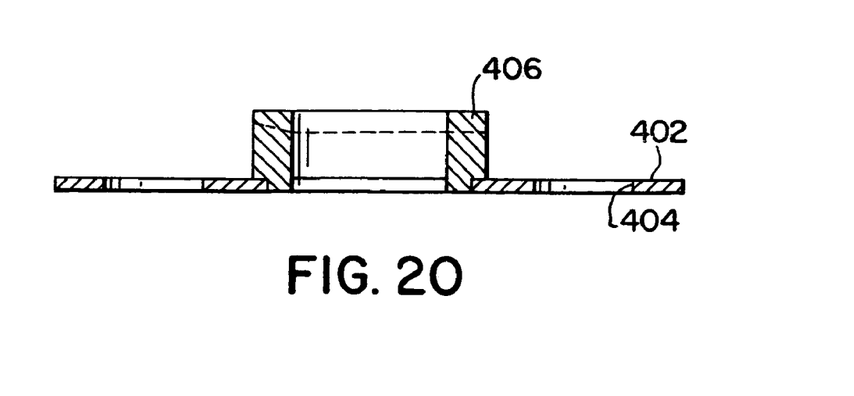
FIG. 20 is a cross sectional side view of the collar of the injection port of FIG. 19 taken along line H-H.

A modification of injection head 100 is shown in FIGS. 18 and 19 as injection head 300. Components in injection head 300 that are similar to those in injection head 100 are not described in detail.

Injection head 300 includes a housing 302 with a supply port 306 and purge port 308. A tube 314 is retained within housing 302 and has corresponding ports. Tube 314 has a lower flange 316 with a seal engaging groove 322. Housing 302 has a locking flange 312 that forms an inwardly facing groove 317 and a partial ledge 319. Ledge 319 has cut-away portions.

Injection spindle 326 is retained within tube 314 and has a concave tip 328. Central section 332 is indented to create a space between spindle 326 and tube 314. The end of spindle 326 is sealed against tube 314 by seal 336. Spindle 326 is supported by rod 338 to form a piston actuated by solenoid 340. A cover 342 is connected to housing 302 around solenoid 340 and has air supply ports 344. A support hook 346 is attached to cover 342.

In this embodiment, the plug is a ball 348. Ball 348 is carried by tip 328 of spindle 326 similar to the prior embodiment. Tip 328 is shaped to fit snugly against ball 348 to prevent resin from accumulating between tip 328 and ball 348. Ball 348 is preferably made of a resilient material, such as EPDM rubber by way of example.

The injection port in the soft tool in this case is configured as a collar 400 that includes a plate 402, for example in the shape of a disk, with apertures 404 formed therein. Plate 402 is attached to the soft tool by molding the sheet over plate 402 or adhering plate 402 with silicon or other suitable compound, for example. Apertures 404 provide an interlocking surface for molding.

A lower puck or sleeve 406 is fixed to plate 402, and an upper puck or sleeve 408 is retained within lower sleeve 406. Lower sleeve 406 has a partial ring 410 extending therefrom. Partial ring 410 is cut away to form a locking ring that mates with groove 317. Sleeve 406 is inserted into groove 317 and turned to lock ring 410 on ledge 319. Lower puck or sleeve 406 can be made of metal, such as stainless steel. Upper puck or sleeve 408 has a central inlet with a concave groove 412 shaped to tightly receive ball 348, as seen in FIG. 18. Sleeve 408 can be made of Teflon or other suitable material.

The process described below and the soft tool 20 described above can be used with either injection head 100 or 300 and their associated collars 200 and 400, described herein, or other types of injection heads and injection ports that provide flowable material. The injection heads can also be used with other suitable sources of flowable material.

Process

Figure 21:
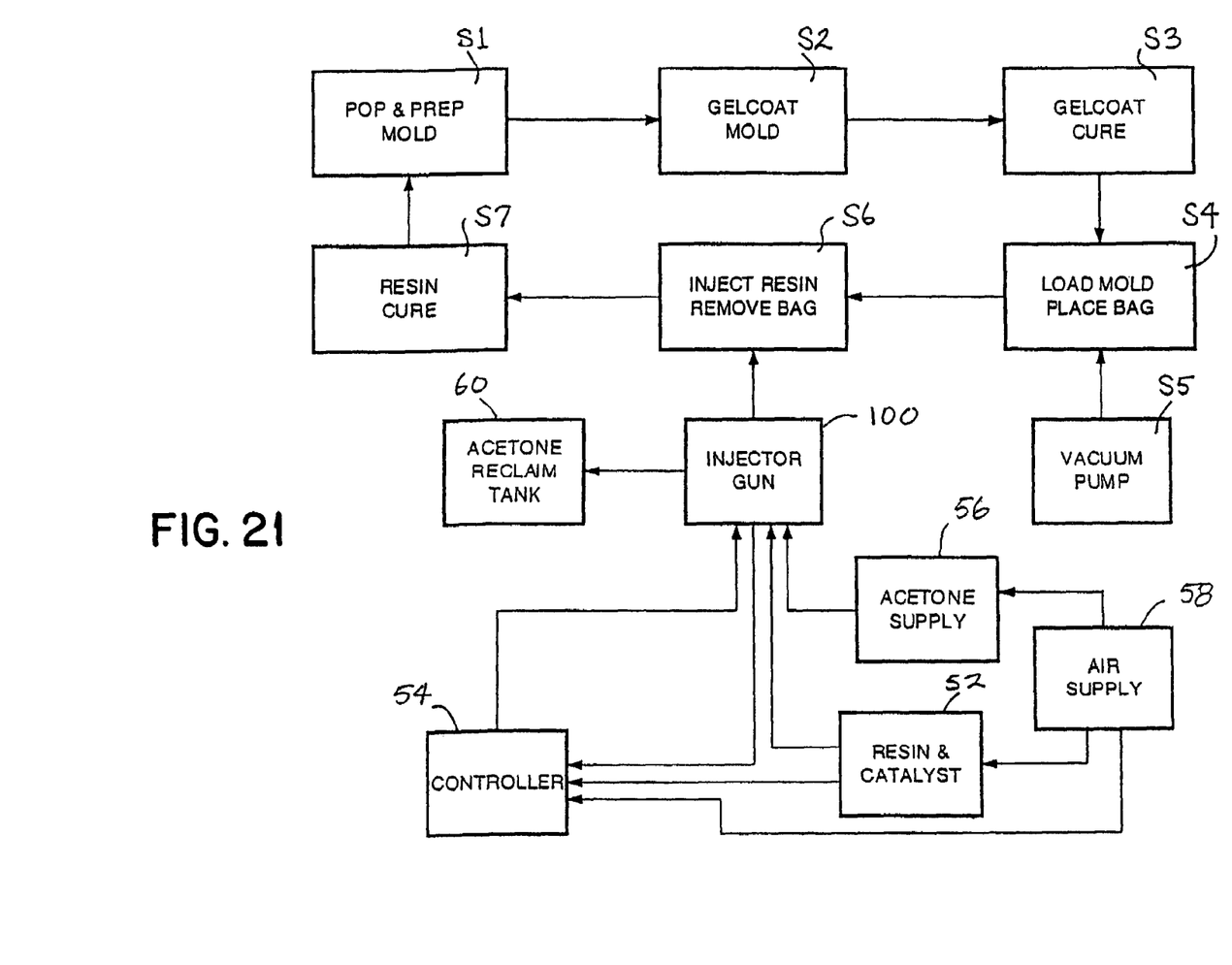
FIG. 21 is a schematic block diagram of the process according to an embodiment of the invention.

The molding process is described referring to FIGS. 1 and 21. Each step (S) can be performed manually or in an automated manufacturing system in which each step or a combination of steps is a station that is either manually or robotically controlled.

To begin the molding process, base mold 12 is prepared (S1). Preparation can include removing a finished part (POP) if the base mold 12 has been used previously and cleaning (PREP) if necessary.

Next, base mold 12 is gel coated (S2), as is conventionally known. Gel coating is not a required step in the process and depends on the materials used and the desired finish on the part. Nevertheless, in this example, a gel coat 36 is applied to central indented section 16 and partially over raised edge 14 of base mold 12 as seen in FIG. 1. Gel coat 36 is then cured (S3) on base mold 12. An example of a standard tack time is 15 minutes and a standard cure time is 40 minutes.

Base mold 12 with gel coat 36 is then loaded with filler material (S4). In this case, fiberglass sheet material or mats are layered into base mold. Depending on the particular intended use of the part, various filler materials can be used. Sheets of various weight, weave, and fiber orientation can be used. A single layer or various layers can be used. If desired, layers each with different qualities, such as weave, weight, orientation can be employed. Further, although fiberglass has been referenced in this example, other suitable "strong fibers", such as carbon fibers, can be used as well.

As seen in FIG. 1, for example, first a print blocking veil 38 is placed on the gel coat 36. Next, a continuous mat of fibers 40 is placed. Then, a stitched mat of fibers 42 is layered on mat 40 and finally another continuous mat of fibers 44 is placed. The print blocking veil is used to improve the cosmetics of the part, and the various mats of fibers vary in weave and thickness.

Other filler material may used, such as foam polyethylene panels 46 to add rigidity and wood blocks 48 for anchoring fasteners. Such filler elements may be interspersed with the fiberglass mats, as seen in FIG. 2, so that when the fiberglass is infused with resin the inserts are encased in the final part.

As noted above, a preform, made for example of fiberglass or other fibers bound into a predetermined shape, could also be used in this process in place of the layer of filler material.

When the filler material is complete, at least one vacuum conduit 50 is positioned at the edge 14 of base mold 12 extending from the fiberglass fill to a position where vacuum channel 28 will be formed. Vacuum conduit 50 can be made of any permeable material, such as a porous, fibrous paper, that allows air to travel through the strip. As seen in FIG. 1, a plurality of vacuum conduits 50 are positioned around the mold to form air passages between the fiberglass fill and vacuum channel 28.

Then, soft tool 20 is placed over base mold 12 and seal 26 is engaged with groove 18 to form an air tight enclosure. A vacuum source V is connected to vacuum port 24 and a vacuum of about 28-29 inches of mercury is drawn (S5).

Injection head 100 (also referred to as an injector) is coupled to injection port 22 and a specified quantity of resin or other appropriate binder is deployed (S6). Resin mixed with a catalyst is delivered from supply 52 with the assistance of air driven supply equipment 58 based on control instructions from controller 54, described below. Resin/catalyst supply 52 can be, for example, a Venus-Gusmer H.I.S. Saturator gun linked to a 10/1 pump that statically mixes catalyst and resin. The resin can be deaerated prior to ejection to provide an improved resin matrix with reduced voids. However, it is not necessary to deaerate as entrapped air will be pulled through the resin by the vacuum.

Injection head 100 ejects resin into mold 10 and the resin wicks into and infuses the fiberglass fill materials. The vacuum that is applied at the edge of the mold creates a drawing force that communicates with the filler material through each vacuum conduit 50. By this, resin is drawn through the fiberglass fill to the edge 14 of the mold 10 and into vacuum conduits 50. By appropriately spacing vacuum conduits 50 and locating injection port or ports 22 at a position or positions spaced from the edge, resin can be accurately and consistently infused through all of the filler material.

As discussed above, after a specified quantity of resin is ejected, injection spindle 126 is moved down chamber 121 to the deployed position and plug 148 is deployed through outlet 110 of injection head 100 into injection port 22 to seal the inlet to soft tool 20 and prevent drawing in air. The resin is then permitted to cure (S7). As vacuum conduits 50 are not self sealing, the vacuum is maintained until the part is cured. When complete, the vacuum source is removed, soft tool 20 is removed, and the part is removed from base mold 12 so that base mold 12 can be used again.

After injection head 100 is removed from injection port 22 and the part is curing, an automatic flush and clean cycle is initiated. Cleaning agent, such as acetone, and air are pumped through purge port 108 from cleaning agent supply 56 and air supply 58. Cleaning agent is flushed through chamber 121 to wash resin residue from chamber 121. The residual cleaning agent resin mixture exits through supply port 106 to cleaning agent reclaim tank 60. An air purge is then initiated to remove any remaining cleaning agent. During this cycle, injection spindle 126 is in the deployed position having just deployed plug 148.

The injection process is controlled by controller 54, which is shown operatively connected to injection head 100, air supply 58 and resin and catalyst supply 52. Controller 54 can be embodied, for example, as an Allen Bradley operating system with an LCD touch control. The control program is custom designed as a programmable loop program to operate in three different modes. A mass flow meter can also be connected to controller 54 to automatically correct and adjust flow.

The operating modes include a manual mode, a manual select mode, and an automatic mode. In the manual mode, all parameters are set manually. In the manual select mode, parameters can be selected from menu of preprogrammed values. Different recipes can be selected, including for example a test shot to initialize the system. The automatic mode can be remotely operated with all parameters preprogrammed. In the automatic mode, the injection port can be keyed for specific parameters that can be accessed by the control system. Therefore, in a case where several injection ports are used, each with a different flow requirement, the ports can be individually indexed, with a bar code for example, and the control system can then sense the index for that particular port and supply the appropriate mix at predetermined flow conditions.

The embodiments described herein are intended to be illustrative of this invention. As will be recognized by those of ordinary skill in the art, various modifications and changes can be made and would remain within the scope of the invention defined in the appended claims.

What is claimed is:

1. An injection head for ejecting a flowable substance, comprising:
    a housing including a chamber defined within at least a portion of the housing, the chamber having a supply port, a purge port, and an outlet spaced along the housing in a longitudinal direction;
    an actuator connected to the housing; and
    an injection spindle connected to the actuator and slidably retained within the chamber between an ejection position and a deployed position; and wherein the injection spindle has a diameter smaller than that of the chamber and is provided with respective larger diameter portions adjacent its two ends, with the larger diameter portions forming respective seals with walls of the chamber to enclose a space between the two larger diameter portions; wherein a plug is disposed within the chamber at an end of the spindle opposite that connected to the actuator; wherein in said ejection position, the two larger diameter portions of the spindle are positioned to connect the supply port with the outlet and seal off the purge port from both the supply port and the outlet, and wherein in said deployed position, the two larger diameter portions are positioned to connect the purge and supply ports and to cause the end of the spindle opposite the actuator and the plug to seal off and to block the outlet and an injection port such that when the injection spindle retracts from the deployed position, the plug remains in communication with the injection port to block the injection port, and wherein the injection head is removable from the injection port after the injection spindle is disposed in the deployed position such that the plug remains blocking the injection port and the end of the spindle opposite the actuator remains sealing off the outlet after the injection head is removed from the injection port.

2. The injection head of claim 1, further comprising a fastener disposed at the outlet of the chamber.

3. The injection head of claim 2, wherein the fastener includes a threaded collar.

4. The injection head of claim 2, wherein the fastener includes a locking groove and flange.

5. The injection head of claim 1, further comprising a tube retained within the chamber in the housing and between the wall of the chamber and the spindle and, wherein the tube is formed of low friction material and is provided with respective openings positioned to correspond with the supply and purge ports of the housing.

6. The injection head of claim 1, wherein the actuator includes a solenoid that is disposed at one end of the housing opposed to the outlet, the supply port is disposed adjacent the outlet, and the purge port is disposed between the supply port and the solenoid.

7. The injection head of claim 1, wherein the supply port is disposed between the purge port and the outlet.

8. The injection head of claim 1, wherein said plug is removable and releasably retained within the chamber.

9. The injection head of claim 8, wherein the removable plug is disposed at an end of the injection spindle when the injection spindle is in the ejection position.

10. The injection head of claim 9, wherein the injection spindle has an end shaped to complement the removable plug.

11. The injection head of claim 9, wherein the plug is slidably retained within the chamber and is positioned at the outlet when the injection spindle is in the deployed position.

12. The injection head of claim 8, wherein the removable plug is a sphere.

13. The injection head of claim 8, wherein the removable plug is a disk shaped object.

14. The injection head of claim 1, further comprising a seal disposed at the outlet of the chamber.

15. The injection head of claim 1, wherein the tube includes an edge at the outlet with an engaging formation and a seal retained within the engaging formation.

16. The injection head of claim 1, wherein the injection spindle has a low friction surface.

17. The injection head of claim 6, wherein the both larger diameter portions of the spindle are disposed between the supply port and the solenoid when the spindle is disposed in the ejection position; and wherein one of the larger diameter portions of the spindle is disposed between the supply port and the outlet and the other larger diameter portion is disposed between the purge port and the solenoid when the spindle is disposed in the deployed position, whereby communication between the supply and purge ports takes place via the enclosed space between the two larger diameter portions of the spindle.

18. A molding system comprising:
    a base mold;
    a soft tool formed as a sheet having an outer edge, a seal formed at the outer edge and connected in sealing engagement with a base mold to form a closed mold, a vacuum channel formed at the outer edge of the sheet and spaced inwardly of the seal, and at least one injection port disposed in the sheet; and
    an injection head releasably connected to the injection port for injecting a flowable substance into the closed mold, including a housing with a chamber defined therein having a supply port, a purge port, and an outlet, an actuator connected to the housing, an injection spindle connected to the actuator and slidably retained within the chamber between an ejection position and a deployed position, and a plug disposed within the chamber at an end of the injection spindle opposite that connected to the actuator wherein when the injection spindle is in said deployed position, the plug blocks the injection port such that when the injection head is removed from the injection port, the plug remains in communication with the injection port to block the injection port.

* * * * *